Patented Nov. 15, 1932

1,887,879

UNITED STATES PATENT OFFICE

TRUMAN B. WAYNE, OF HOUSTON, TEXAS, ASSIGNOR TO NATIONAL ALUMINATE CORPORATION, OF CHICAGO, ILLINOIS, A CORPORATION OF DELAWARE

PROCESS OF DEFECATING CANE JUICE

No Drawing.   Application filed September 8, 1930. Serial No. 480,609.

The present invention relates to an improved process for treating solutions containing sucrose and other constituents, wherein the sucrose is considered as the desirable constituent and the others as impurities associated with the sucrose, which impurities should be removed as completely as practicable in order to increase the proportion of sucrose in the solution, and thereby increase its availability as crystallizable sucrose in the pan-boiling operations which follow.

The process is especially applicable to the purification of raw cane juices such as are expressed from sugar cane in raw sugar factories, and with certain obvious modifications may be employed on other syrups found in raw sugar factories and refineries.

Cane juice expressed from the mills is customarily clarified or "defecated" with lime. The object of this clarification is to remove from the juice the maximum quantity of impurities at the earliest possible stage of the process. Different juices from different localities, or even from the same locality, differ greatly in the amount of lime necessary for proper defecation, but in general sufficient lime is added to neutralize the organic acids present and produce a complex, flocculent precipitate of organic and inorganic constituents of the juice which mechanically envelop and carry down finely divided suspended matter.

It is now well known that the degree of clarification has a great bearing on the efficiency of operations at subsequent stations in the factory—the pan-boiling, the centrifugalizing of the sugars, (especially the low goods) the quality of the products, and of most importance—the yield of raw sugar. In addition, efficient clarification reduces time-losses and expense due to cleaning fouled apparatus. This is of prime importance in factory operation and fuel economy.

When the raw sugars go to the refinery to be made into refined sugars, deficiencies in clarification at the raw sugar factory again come to the front and result in slowing down the filtration and other purification processes of the refinery; as well otherwise manifesting themselves in reduced yields, increased costs, and by their adverse effect on the quality of the finished product.

Much evidence has been accumulated that the phosphate content of the raw juice is the major factor in efficient clarification. Many investigators have independently established this fact, and it has also been shown that it was immaterial whether the phosphate was naturally present or added subsequently. The elimination of colloids was found to be a direct function of the percentage of phosphorous pentoxide ($P_2O_5$) present when lime is used to raise the alkalinity of the juice to a given hydrogen-ion concentration (pH). About twenty per cent of the precipitate is ash which has been shown to consist principally of calcium oxide (CaO) and phosphorous pentoxide ($P_2O_5$) with appreciable quantities of magnesium, aluminum and iron.

Defecation, therefore, is essentially an inorganic reaction in which the flocculent precipitate of calcium phosphate and other insoluble salts mechanically carries down with it the coarse suspended matter and adsorbs some of the colloids. Hardly more than five per cent of the total non-sugars, other than that originally present in suspension, in the juice are removed by the usual lime defecation process. For these reasons, other inorganic chemicals such as sulfur dioxide or phosphates have been used to some extent with lime to aid in the removal of the impurities.

The usual defecation process with lime removes only a small proportion of the impurities in the juice, probably because the proportion of inorganic constituents of the juice capable of reaction with lime to produce the desired flocculent precipitate is too small to carry down a considerable proportion of the organic non-sugars. The use of inorganic acids and salts in connection with lime increases the non-sugar elimination because of the greater volume of inorganic precipitate produced. However, many of these defecating agents cause practical difficulties in factory operation, such as scaling of evaporators, difficulty at the mud press station, etc.

My present invention, however, on the other hand, avoids the above-mentioned difficulties and produces clearer, brighter, and purer clarified juices. There is a marked reduction in the objectionable iron-polyphenol compounds which discolor clarified cane juices after standing, and also a considerable elimination of such encrusting inorganic constituents as silica, iron, and magnesia from the juices treated by my process.

I accomplish this result by the addition of a solution of a soluble aluminate, preferably sodium aluminate, to the raw juice followed by the addition of lime to produce an inorganic precipitate of calcium aluminate and possibly some aluminum hydroxide which entangle and adsorb some of the organic non-sugars, and thereby produce a better clarification. The sodium aluminate, in the proportion of from 0.25 to 1.0 lb. of dry sodium aluminate (or its equivalent of the commercial liquid sodium aluminate) per 1000 gallons of juice is preferably added to the cold or heated raw juice and thoroughly mixed in to allow any reactions between it and the inorganic constituents to occur that will, and this is followed by the addition of lime sufficient to raise the alkalinity of the juice to pH 8.3–9.0 after which the chemically treated juice is heated to 210–220° F. to produce the desired coagulation ("break"). The amounts of sodium aluminate and lime which must be used depend on the characteristics of the raw juice, and this can be readily determined by those skilled in the art of clarifying cane juice.

The sodium aluminate and lime may be mixed prior to adding them to the juice, but it has been found that the results are not as satisfactory as when they are added separately to the juice as described above and in the order stated. This is probably due to the fact that when sodium aluminate is added directly to the raw juice it reacts to some extent with the magnesium and calcium salts present in the mineral constituents of the juice, and when an excess of lime is added subsequently the mass action effect produces a marked coagulating and precipitating effect when the juice is heated.

It is probable, also, that some of these inorganic constituents are intimately associated with the organic non-sugars, and when precipitation occurs within the solution more of the latter are adsorbed and entangled by the inorganic precipitates than would be the case if the sodium aluminate was allowed to react with the lime before adding it to the raw juice.

In this connection I wish to point out that it has been proposed to treat strongly limed raw beet-juice with sodium aluminate for the purpose of removing therefrom the excess of lime. For example, in United States Patent No. 1,578,463, granted to Nicholson and Beal, there is described and claimed a process of treating limed beet-juice with sodium aluminate. The primary object of these inventors was to remove the excess of caustic lime left in the juice when treating it with caustic lime after coming from the diffusion battery of a beet mill. In the manufacture of beet sugar an alkaline juice is encountered all through the factory because the composition of beet juice is such that high alkalinities may be carried. In cane juice defecation, however, high alkalinities cannot be carried owing to the presence of reducing sugars which are decomposed by an excess of lime to form dark colored decomposition products which will later interfere with the extraction of sugar from the juice as well as adversely affect the quality of the sugar produced. For that reason, although the first step in a beet factory is to lime the juices to a high alkalinity, in a cane factory this cannot be done.

In a beet factory the lime is put in first and then removed with other agents, such as carbon dioxide, etc., and Nicholson and Beal proposed to use sodium aluminate for the removal of this lime instead of the usual agents such as carbon dioxide, etc. They necessarily then must add the sodium aluminate last.

In a cane factory, however, the juice is limed to a little above neutrality and the reaction between the lime and the constituents of the juice produces the clarifying effect and no treatment follows to remove the excess of lime. In the first place an excess of lime could not be used owing to the destruction of the reducing sugars and for that reason there is no large excess to remove. Liming when properly done usually, leaves less lime salts in the juice than were present before the defecation process occurred.

Now in accordance with my present invention, I propose to add sodium aluminate to the raw cane juice to augment artificially the bodies within the raw juice that will produce a flocculent precipitate with lime. In addition, the sodium aluminate neutralizes some of the organic acids of the raw juice and forms insoluble heavy metallic salts which are then flocculated by the change in the hydrogen-ion concentration caused by the addition of lime. Cane juice contains considerable proportions of natural phosphates and compounds of calcium, magnesium, and silicon which produce flocculent precipitates when heated with lime.

However, the proportion of these precipitate-forming materials is too low effectually to remove a very large proportion of the much larger ratio of the organic non-sugars present. For this reason if sodium aluminate is added to the raw juice to increase the proportion of floc-forming reactive bodies and also to have a desirable effect on the natural bodies of this character in the juice, it causes the precipitation of a most satisfactory precipitate with lime.

It was found in my experimental work that the use of sodium aluminate in the raw juice ahead of the lime produced an entirely different effect from that produced by liming first and adding sodium aluminate later. In the latter case the sodium aluminate reacts with the lime to form calcium aluminate and the clarifying action would be purely mechanical instead of the more thorough effect produced by getting the aluminate intimately mixed with the natural floc-forming constituents of the juice and then precipitating the entire mass with lime.

As a specific example of one method of carrying out my invention I will now describe the defecation and settling of raw cane juice.

The raw cane juice expressed from the mills is pumped to a small mixing tank or receptacle where sodium aluminate solution of any convenient strength, preferably 20° Bé., is added either continuously or intermittently in the proportion of from 0.25 to 1.0 lb. of dry $Na_2Al_2O_4$ per 1000 gallons of raw juice. Another convenient method is to mix the sodium aluminate solution with the juice by injecting it by means of a proportioning pump into the juice line leading to the liming tanks.

The raw juice containing the sodium aluminate solution is then limed either cold or hot, depending on the preferences of the operator, in any convenient apparatus and unless it has been heated previously is pumped through the juice heaters and heated to 210°–220° F. and sent to the settling tanks. The latter may be of conventional type or special design such as the Dorr clarifier, etc. wherein the flocculent precipitate is settled out and the clear juice sent to the evaporators. The muds may then be sent to the filter presses or otherwise disposed of, depending on the process employed in each factory.

It is also contemplated that the method of juice clarification herein described can be applied to the so-called "compound clarification" method wherein the high and low purity juices are separately defecated and the low purity defecated juices are then again treated with clarifying agents after adding them to the high purity raw juices.

The clear defecated juice is then evaporated to a syrup in the usual evaporators and then boiled into sugar by the conventional vacuum-pan process. If it is desired that white sugar be made directly from the cane juice, the defecated juice may be bleached or decolorized by the use of chemicals or decolorizing carbons either before or after evaporating to the syrup. In any event, the marked clarifying and decolorizing action of the sodium aluminate-lime clarification process herein claimed and described improves the quality of the finished sugars through elimination of undesirable coloring matter, colloids, and ash from the juice.

No claim is made to any of the other steps or modifications in the various processes which may be used in the manufacture of raw or white sugar from juice defecated by my process, as it is intended that the step of defecating can juice with lime and a soluble aluminate be applied to any existing process, whether patented or not, to improve said processes, and that said improved defecation process, alone, is the subject of my claims.

The sodium aluminate reagent above described may be a solution containing various percentages of $Na_2Al_2O_4$ in the presence of $NaOH$ and/or $Na_2CO_3$, but the free alkali content should be as low as is permissible for a stable sodium aluminate solution. The presence of $Na_2CO_3$ is to be preferred over $NaOH$ because of its smaller soda alkali content, and because the $CO_3$ radical forms an insoluble precipitate of $CaCO_3$ with the lime added in the defecation process. The aluminate radical is precipitated as insoluble calcium and magnesium aluminates, and probably partly as aluminum hydroxide.

It is to be understood that other water soluble or cane juice soluble aluminates may be employed or substituted for sodium aluminate with effective results, although sodium aluminate is preferred, because it is cheaper and more easily obtained. Thus, barium aluminate, in water soluble form, may be substituted for the sodium aluminate herein disclosed when following the teachings of the present invention.

Furthermore, I do not wish to be limited to the exact amounts of materials herein specified nor to the exact details as to procedure, but claim as my invention:

1. Process of defecating cane juice which comprises treating the same with a soluble aluminate followed by addition of lime.

2. Process of defecating cane juice which comprises treating the same with sodium aluminate followed by the addition of lime.

3. The process of defecating cane juice which comprises treating the same with a solution of sodium aluminate followed by the addition of a suspension of calcium hydroxide.

4. The process of treating raw sugar-cane juice which comprises adding thereto from 0.25 to 1.0 lb. of sodium meta-aluminate per 1,000 gallons of juice, followed later by the addition of lime.

5. The process of treating raw sugar-cane juice which comprises adding thereto from 0.25 to 1.0 lb. of sodium meta-aluminate per 1,000 gallons of juice, followed later by the addition of calcium hydroxide, and then heating the resulting mixture to from 210–220° F. thereupon allowing the impurities precipitated by this treatment to settle, and withdrawing the purified cane-juice.

In witness whereof, I have hereunto subscribed my name.

TRUMAN B. WAYNE.